(12) United States Patent
Jang et al.

(10) Patent No.: US 9,076,396 B2
(45) Date of Patent: Jul. 7, 2015

(54) TIMING CONTROLLER, DRIVING METHOD THEREOF, AND FLAT PANEL DISPLAY DEVICE USING THE SAME

(71) Applicant: LG DISPLAY CO., LTD., Seoul (KR)

(72) Inventors: SuHyuk Jang, Paju-si (KR); JongWoo Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 225 days.

(21) Appl. No.: 13/727,322

(22) Filed: Dec. 26, 2012

(65) Prior Publication Data

US 2014/0085326 A1  Mar. 27, 2014

(30) Foreign Application Priority Data

Sep. 25, 2012 (KR) .................. 10-2012-0106443

(51) Int. Cl.
| | |
|---|---|
| G09G 5/02 | (2006.01) |
| G09G 3/20 | (2006.01) |
| G09G 3/08 | (2006.01) |
| G02F 1/133 | (2006.01) |
| H04N 1/60 | (2006.01) |
| G09G 3/36 | (2006.01) |
| G06T 11/00 | (2006.01) |

(52) U.S. Cl.
CPC ............ *G09G 3/3607* (2013.01); *G06T 11/001* (2013.01); *G09G 5/02* (2013.01); *H04N 1/6058* (2013.01); *G09G 3/2096* (2013.01); *G09G 2370/08* (2013.01)

(58) Field of Classification Search
USPC ............ 345/22, 63, 204, 519, 589, 590, 591, 345/600, 605, 606, 690–692; 348/254, 348/434.1, 435.1, 441, 458, 476–479, 500, 348/516, 723, 725, 728, 739, 742, 761, 790, 348/791, 792; 358/518–520, 525; 382/162–163, 167, 254, 274, 276
See application file for complete search history.

(56) References Cited

U.S. PATENT DOCUMENTS 5,844,532 A * 12/1998 Silverbrook et al. ........... 345/89
2007/0200807 A1   8/2007 Lee et al.
(Continued)

FOREIGN PATENT DOCUMENTS

| JP | 4-190466 A | 7/1992 |
|---|---|---|
| JP | 2009/153239 A | 7/2009 |

(Continued)

*Primary Examiner* — Wesner Sajous
(74) *Attorney, Agent, or Firm* — Birch, Stewart, Kolasch & Birch, LLP

(57) ABSTRACT

Discussed is a timing controller. The timing controller includes a receiver, a converter, an aligner, and an EPI transmitter. The receiver receives input RGB data from an external system. The converter converts the input RGB data into input WRGB data. The aligner converts one of W, R, G, and B data, composing the input WRGB data, into 0 to generate conversion WRGB data having bits less than the total number of bits composing the W, R, G, and B data. The EPI transmitter generates WRGB data by adding dummy bits to the conversion WRGB data, and outputs the WRGB data to a source driver IC.

13 Claims, 6 Drawing Sheets

(56) References Cited

U.S. PATENT DOCUMENTS

| | | |
|---|---|---|
| 2009/0156024 A1 | 6/2009 | Chung |
| 2009/0284509 A1 | 11/2009 | Choe |
| 2009/0284546 A1* | 11/2009 | Brown Elliott ............... 345/596 |
| 2011/0025591 A1* | 2/2011 | Han et al. ...................... 345/102 |
| 2011/0025592 A1* | 2/2011 | Botzas et al. ................. 345/102 |
| 2011/0242066 A1 | 10/2011 | Jeon et al. |
| 2012/0026203 A1 | 2/2012 | Liu et al. |
| 2012/0287141 A1* | 11/2012 | Higgins et al. ................ 345/581 |
| 2013/0002618 A1 | 1/2013 | Furihata et al. |

FOREIGN PATENT DOCUMENTS

| | | |
|---|---|---|
| JP | 2013/11769 A | 1/2013 |
| KR | 10-2007-0088000 A | 8/2007 |
| KR | 10-2009-0120256 A | 11/2009 |
| KR | 10-2011-0111812 A | 10/2011 |

* cited by examiner (A)    (B)    (C)

TIMING CONTROLLER, DRIVING METHOD THEREOF, AND FLAT PANEL DISPLAY DEVICE USING THE SAME

CROSS-REFERENCE TO RELATED APPLICATIONS

This application claims the benefit of the Korean Patent Application No. 10-2012-0106443 filed on Sep. 25, 2012, which is hereby incorporated by reference as if fully set forth herein.

BACKGROUND

1. Field of the Invention

The present invention relates to a timing controller and a liquid crystal display (LCD) device using the same, and more particularly, a timing controller for receiving RGB data to output WRGB data, a driving method thereof, and an LCD device using the same.

2. Discussion of the Related Art

With the advancement of various portable electronic devices such as mobile phones, personal digital assistants (PDAs), and notebook computers, the demand for Flat Panel Display (FPD) devices applicable to the portable electronic devices are increasing.

LCD devices, plasma display panels (PDPs), field emission display (FED) devices, and light emitting display devices are actively researched as FPD devices.

In such FPD devices, LCD devices are devices that display an image using the optical anisotropy of liquid crystal. Since the LCD devices have a thin thickness, a small size, and low power consumption and realize a high-quality, the LCD devices are widely used.

FIG. 1 is a timing chart for transferring RGB data from an embedded point to point interface (EPI) transmitter of a timing controller, applied to a related art LCD device, to a source driver IC. FIG. 2 is a timing chart for transferring WRGB data from the EPI transmitter of the timing controller, applied to the related art LCD device, to the source driver IC.

The related art LCD device includes a timing controller, a source driver IC, a gate diver IC, and a panel.

Generally, the panel of the related art LCD device includes a plurality of red (R) sub-pixels, green (G) sub-pixels, and blue (B) sub-pixels for realizing colors. To this end, input RGB data are inputted from an external system (for example, a television set) to the timing controller of the related art LCD device. In this case, the timing controller aligns input RGB data according to a pixel structure of the panel, and outputs the aligned RGB data to the source driver IC. The source driver IC converts digital WRGB data, received from the timing controller, into analog WRGB signals and outputs the analog WRGB signals to the panel.

An LCD device, having a WRGB pixel structure that includes both RGB sub-pixels having three primary colors and a white (W) sub-pixel transmitting white light, is recently developed for enhancing luminance of LCD devices. A timing controller of an LCD device having a WRGB pixel structure converts input RGB data, inputted from an external system, into WRGB data and outputs the WRGB data to the source driver IC. The source driver IC converts the digital WRGB data, received from the timing controller, into analog WRGB image signals and outputs the analog WRGB image signals to the panel.

In the two cases, the converted WRGB data from the timing controller are transferred to the source driver IC through one of various interfaces such as a mini-low voltage differential signaling (LVDS) interface and an EPI. Recently, the EPI is widely used as interface between the timing controller and the source driver IC.

FIG. 1 is a timing chart showing a timing in which when the timing controller receives the input RGB data and transfers the RGB data to the source driver IC, the EPI transmitter of the timing controller using the EPI scheme transfers the RGB data to the source driver IC.

When each of R, G, and B data composing the RGB data is composed of 10 bits, the EPI transmitter transfers 30-bit parallel data to the source driver IC by 34 bits according to EPI protocol. To provide an additional description, the EPI transmitter transfers 34-bit RGB data, in which 4 dummy bits have been added to the 30-bit RGB data, to the source driver IC.

In this case, as expressed in the following Equation (1), the maximum data transfer rate of the EPI transmitter is 1.156 Gbps. When the maximum frequency of a data clock is 85 MHz, the RGB data are composed of 34 bits, the RGB data are transferred to the source driver IC through four ports, and the number of source driver ICs (EPI ports) is 10, the maximum data transfer rate is 1.156 Gbps.

$$\text{Data Rate Max}=85\text{ MHz(Data Freq Max)}\times 4(\text{Port Number})/10(\text{EPI Port})\times 34(\text{Data Unit})=1.156\text{ Gbps} \quad (1)$$

The maximum data transfer rate is within a range of 1.6 Gbps that is the maximum data transfer rate between the EPI transmitter and the source driver IC. Therefore, the RGB data are normally transferred to the source driver IC.

FIG. 2 is a timing chart showing a timing in which when the timing controller receives the input RGB data, converts the RGB data into WRGB data, and transfers the WRGB data to the source driver IC, the EPI transmitter of the timing controller using the EPI scheme transfers the WRGB data to the source driver IC.

When each of R, G, and B data composing the RGB data is composed of 10 bits, the timing controller converts the 30-bit RGB data into 40-bit WRGB data, and the EPI transmitter segments 40-bit parallel data in units of 20 bits and transfers the segmented data to the source driver IC by 20 bits according to the EPI protocol. To provide an additional description, the EPI transmitter segments 40-bit parallel data in units of 20 bits and transfers 24-bit WRGB data including dummy bits to the source driver IC.

In this case, as expressed in the following Equation (2), the maximum data transfer rate of the EPI transmitter is 1.632 Gbps. When the maximum frequency of the data clock is 85 MHz, the WRGB data are composed of 24 bits, the RGB data are transferred to the source driver IC through four ports, there are two transfer paths, and the number of source driver ICs (EPI ports) is 10, the maximum data transfer rate is 1.632 Gbps.

$$\text{Data Rate Max}=85\text{ MHz(Data Freq Max)}\times[4(\text{Port Number})\times 2(\text{Pixel Split})]/10(\text{EPI Port})\times 24(\text{Data Unit})=1.632\text{ Gbps} \quad (2)$$

The maximum data transfer rate exceeds a range of 1.6 Gbps that is the maximum data transfer rate between the EPI transmitter and the source driver IC. Therefore, the WRGB data are not normally transferred to the source driver IC.

Therefore, in an LCD device using WRGB data, an input data clock is limited. That is, the LCD device using WRGB data uses a data clock range different from that of an LCD device using RGB data.

To transfer the WRGB data, the EPI transmitter and the source driver IC are driven at a speed higher than that of the LCD device using RGB data. However, as described above, since the maximum data transfer rate necessary for transferring WRGB data exceeds the maximum data transfer rate between the EPI transmitter and the source driver IC, it is substantially difficult to transfer WRGB data.

Moreover, since a data format (34 bits) for transferring RGB data differs from a data format (24 bits) for transferring WRGB data, it is impossible to identically apply the EPI transmitter and the source driver IC to both the LCD device using RGB data and the LCD device using WRGB data.

Moreover, when the EPI transmitter and source driver IC for transferring RGB data and the EPI transmitter and the source driver IC for transferring WRGB data are designed and manufactured separately, the manufacturing cost of the LCD device increases inevitably.

Moreover, as illustrated in FIG. 2, when 24-bit WRGB data are transferred, jitters severely occur between a first transfer unit and a last transfer unit.

The above-described drawbacks occur in all FPD devices using a timing controller, a source driver IC, and an EPI, in addition to LCD devices.

SUMMARY

Accordingly, the present invention is directed to a timing controller, a driving method thereof, and an LCD device using the same that substantially obviate one or more problems due to limitations and disadvantages of the related art.

An aspect of the present invention is directed to a timing controller, a driving method thereof, and an FPD device using the same, which convert input RGB data into input WRGB data, generate WRGB data including location information on data (which are generated by converting one of W, R, G, and B data composing the input WRGB data into 0) and the converted data of 0, and transfer the WRGB data to a source driver IC.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a timing controller including: a receiver receiving input RGB data from an external system; a converter converting the input RGB data into input WRGB data; an aligner converting one of W, R, G, and B data, composing the input WRGB data, into 0 to generate conversion WRGB data having bits less than the total number of bits composing the W, R, G, and B data; and an EPI transmitter generating WRGB data by adding dummy bits to the conversion WRGB data, and outputting the WRGB data to a source driver IC.

In another aspect of the present invention, there is provided a method of driving a timing controller which includes: receiving input RGB data and a timing signal from an external system; converting the input RGB data into input WRGB data; converting one of W, R, G, and B data, composing the input WRGB data, into 0 to generate conversion WRGB data having bits less than the total number of bits composing the W, R, G, and B data; and generating WRGB data by adding dummy bits to the conversion WRGB data, and outputting the WRGB data to a source driver IC.

In another aspect of the present invention, there is provided a flat panel display device including: the timing controller; a panel, a plurality of data lines and gate lines being formed in the panel; at least one or more source driver ICs converting the WRGB data, transferred from the timing controller, into analog WRGB image signals and respectively outputting the WRGB image signals to the data lines; and at least one or more gate driver ICs generating a scan signal with a control signal transferred from the timing controller, and sequentially outputting the scan signal to the gate lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
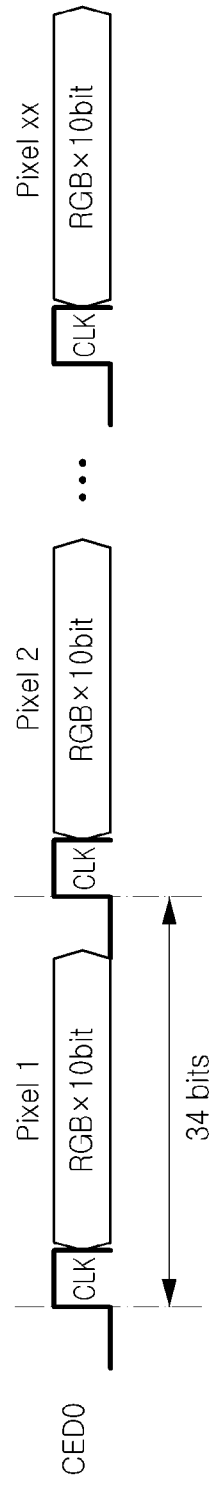
FIG. 1 is a timing chart for transferring RGB data from an EPI transmitter of a timing controller, applied to a related art LCD device, to a source driver IC.
Figure 2:
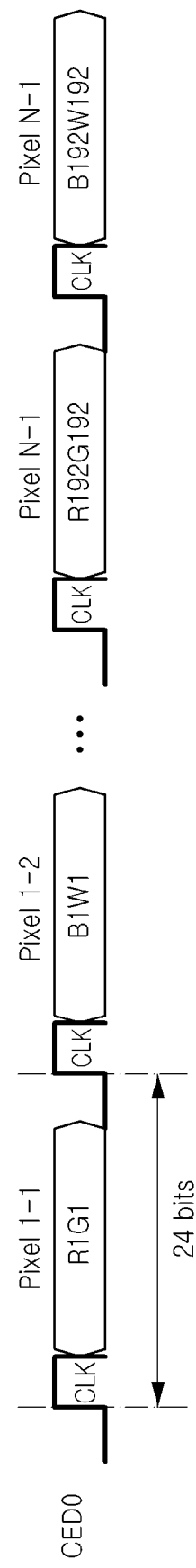
FIG. 2 is a timing chart for transferring WRGB data from the EPI transmitter of the timing controller, applied to the related art LCD device, to the source driver IC.
Figure 3:
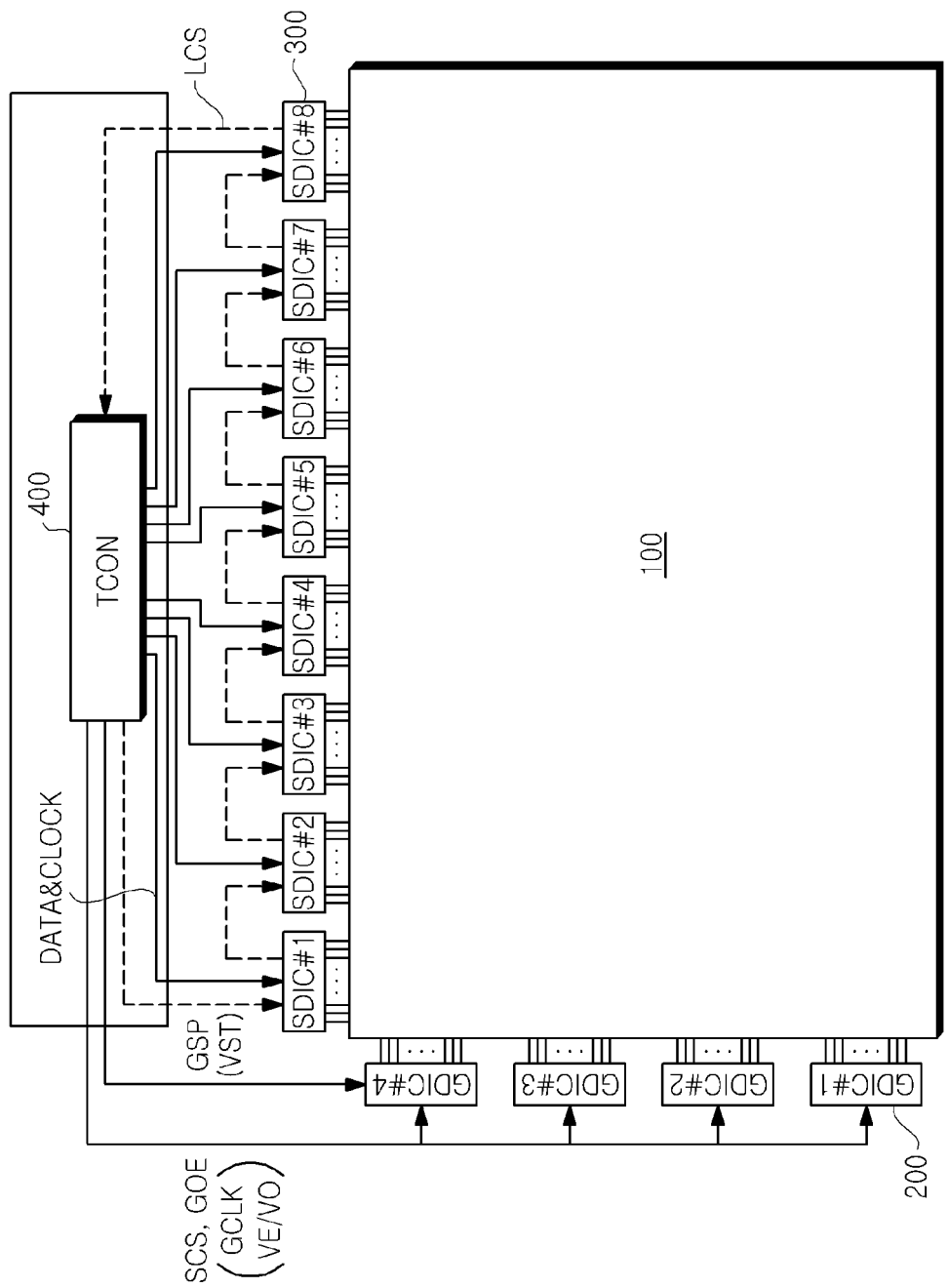
FIG. 3 is an exemplary diagram illustrating a configuration of an LCD device using a timing controller according to the present invention.

FIG. 3 is an exemplary diagram illustrating a configuration of an LCD device using a timing controller according to the present invention.

A timing controller 400 according to the present invention may be applied to LCD devices including a panel, driven with WRGB data into which input RGB data have been converted, and organic light emitting diode (OLED) display devices including a panel driven with the WRGB data. Hereinafter, for convenience of a description, an LCD device will be described as an example of a flat panel display device according to the present invention.

The LCD device according to the present invention, as illustrated in FIG. 3, includes: a panel 100; at least one or more gate driver ICs (GDIC#1 to GDIC#4) 200 for driving a plurality of gate lines formed in the panel 100; at least one or more source driver ICs (SDIC#1 to SDIC#8) 300 for driving a plurality of data lines formed in the panel 100; and a timing controller 400 for controlling the gate driver IC 200 and the source driver IC 300.

The panel 100 includes a pixel that is formed in each of areas defined by respective intersections between the gate lines and the data lines, and includes a thin film transistor (TFTs) and a pixel electrode.

The TFT supplies an image signal, transferred from a corresponding data line, to the pixel electrode in response to a scan signal supplied from a corresponding gate line. In response to the image signal, the pixel electrode drives liquid crystal disposed between the pixel electrode and a common electrode, thereby adjusting light transmittance.

A liquid crystal mode of a panel applied to the present invention may be implemented as various liquid crystal modes such as a TN mode, a VA mode, an IPS mode, an FFS mode, etc. Also, the LCD device according to the present invention may be a transmissive LCD device, a semi-transmissive LCD device, a reflective LCD device, or the like.

Especially, the panel 100 applied to the present invention has a WRGB pixel structure. Specifically, in order to enhance the luminance of the LCD device, the panel 100 applied to the present invention additionally includes a W sub-pixel transmitting white light, in addition to RGB sub-pixels having three primary colors. Here, the WRGB pixel structure may be formed in various types.

The timing controller 400 generates a gate control signal GCS for controlling the operation timing of the gate driver ICs 200 and a data control signal DCS for controlling the operation timing of the source driver ICs 300 with a timing signal (i.e., a vertical sync signal Vsync, a horizontal sync signal Hsync, and a data enable signal DE) inputted from an external system, and generates WRGB data to be transferred to the source driver ICs 300.

The timing controller 400 transfers WRGB data to the source driver IC 300 by using an EPI.

The timing controller 400 according to the present invention converts input RGB data, transferred from the external system, into WRGB data according to the WRGB pixel structure of the panel 100, and transfers the WRGB data to the source driver IC 300. The source driver IC 300 is also used to receive WRGB data.

The timing controller 400 according to the present invention may transfer WRGB data to the source driver IC 300 capable of receiving RGB data. To this end, the timing controller 400 converts input RGB data into input WRGB data, generates WRGB data including location information on data (which are generated by converting one of W, R, G, and B data composing the input WRGB data into 0) and the converted data of 0, and transfers the WRGB data to a source driver IC. A detailed configuration and function of the timing controller 400 according to the present invention will be described with reference to FIGS. 4 to 7.

Each of the gate driver ICs (GDIC#1 to GDIC#4) 200 supplies the scan signal to the gate lines with gate control signals GCS generated by the timing controller 400. That is, the gate driver IC 200 applied to the present invention may be the same as a gate driver IC applied to the related art LCD device. The gate driver IC 200, as illustrated in FIG. 3, may be provided independently from the panel 100, and electrically connected to the panel 100 in various types. However, as another example, the gate driver IC 200 may be provided in a gate-in panel (GIP) type in which a gate driver IC is disposed inside a panel.

The source driver IC 300 converts WRGB data, transferred from the timing controller 400, into analog WRGB image signals and supplies the analog WRGB image signals for one horizontal line to the data lines in units of one horizontal period for which the scan signal is supplied to one gate line. In detail, the source driver IC 300 converts the WRGB data into the WRGB image signals with gamma voltages supplied from a gamma voltage generator (not shown), and outputs the WRGB image signals to the data lines. To this end, the source driver IC 300 includes a shift register, a latch, a digital-to-analog converter (DAC) 421, and an output buffer.

The source driver IC 300 receives WRGB data from the timing controller 400 by using the EPI.

The source driver IC 300 applied to the present invention may be the same as a source driver IC applied to the related art LCD device using the EPI type.

The source driver IC 300 may receive RGB data from the timing controller 400, convert the RGB data into analog RGB image signals, and supply the RGB image signals to the respective data lines.

That is, the source driver IC 300 and the timing controller 400 may use the EPI, and may use a general source driver IC, which receives RGB data from the timing controller 400 and outputs the RGB data to the panel 100, as-is.

Therefore, the source driver IC 300 may receive RGB data from the timing controller 400 and output the RGB data, or may receive and output WRGB data.

Figure 4:
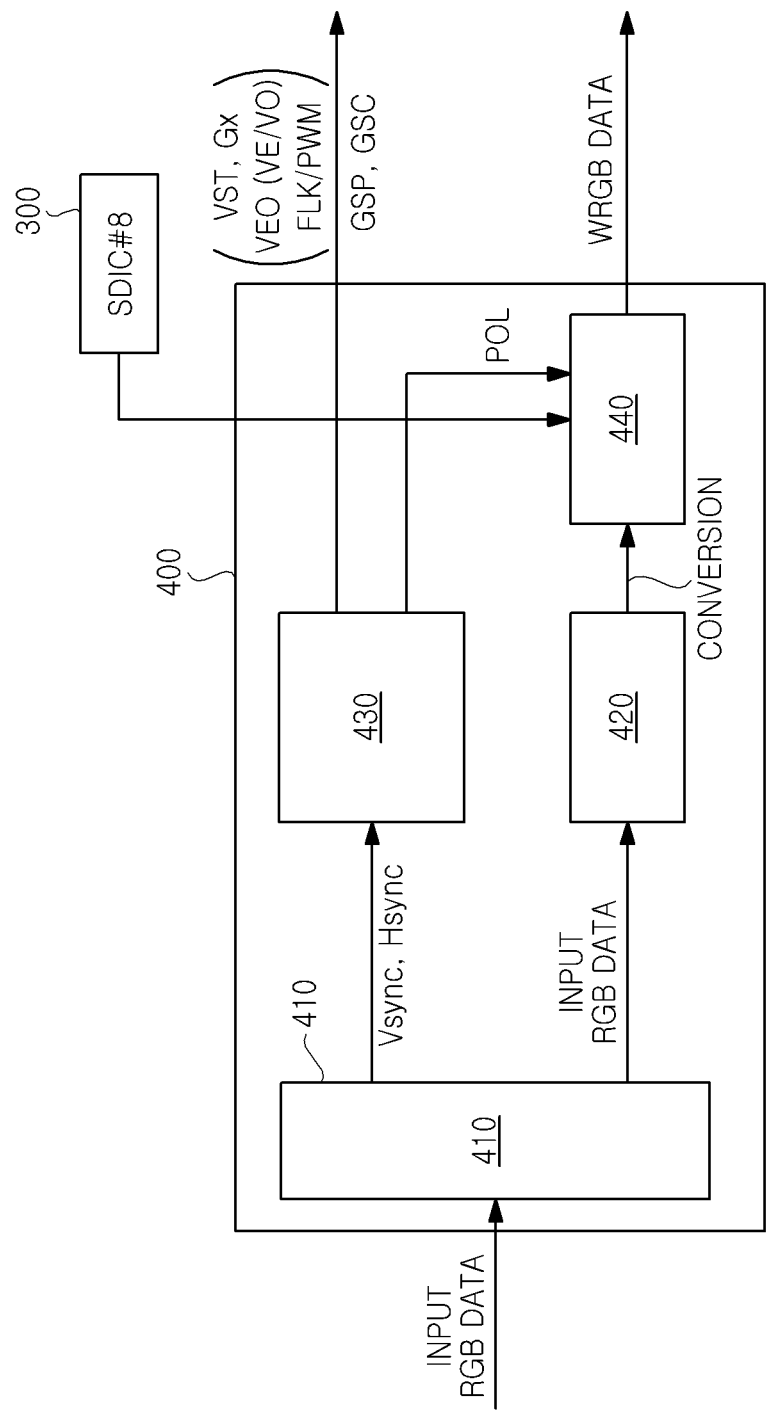
FIG. 4 is an exemplary diagram illustrating in detail an internal configuration of the timing controller according to the present invention.
Figure 5:
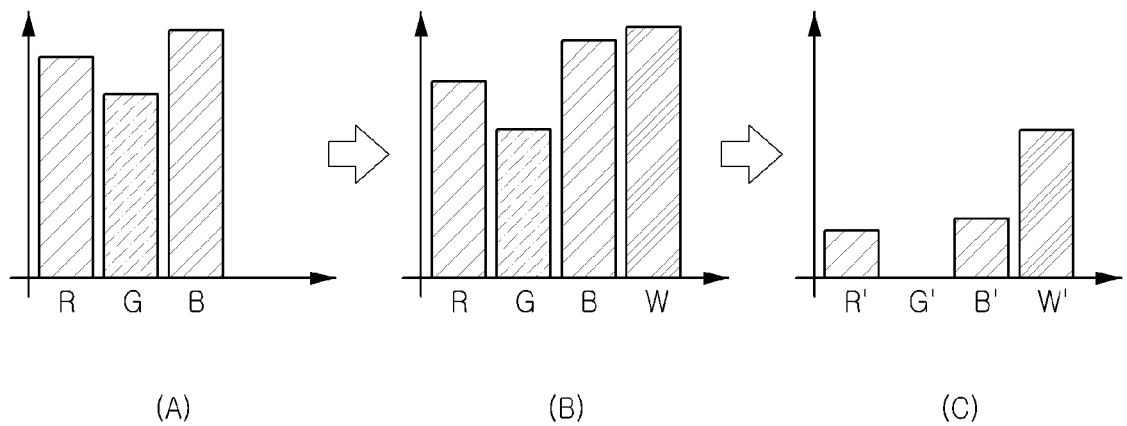
FIG. 5 is an exemplary diagram for describing a method in which the timing controller according to the present invention converts input RGB data into conversion WRGB data.
Figure 6:
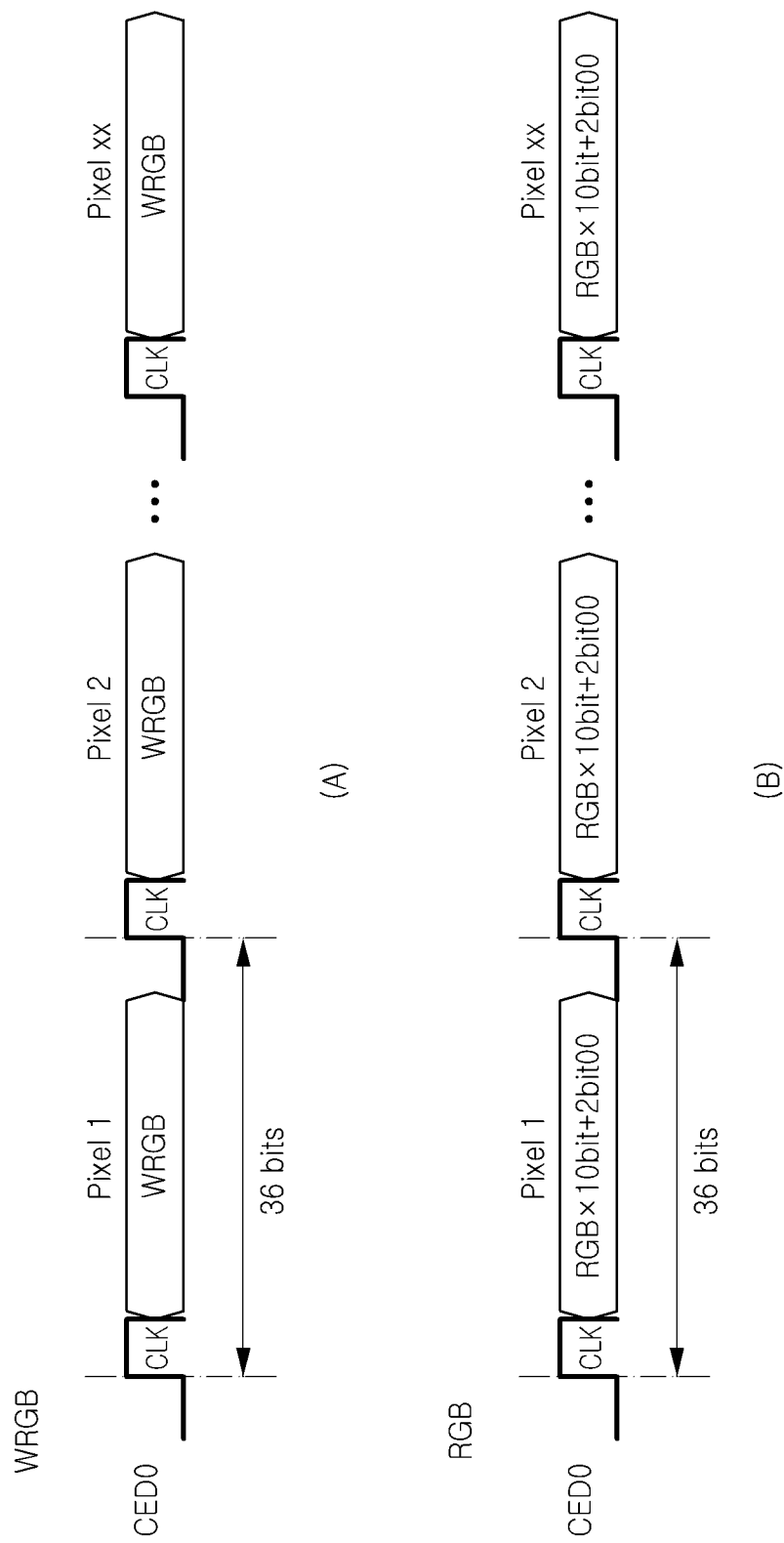
FIG. 6 is an exemplary diagram showing a timing in which the timing controller according to the present invention transfers RGB data or WRGB data to a source driver IC.
Figure 7:
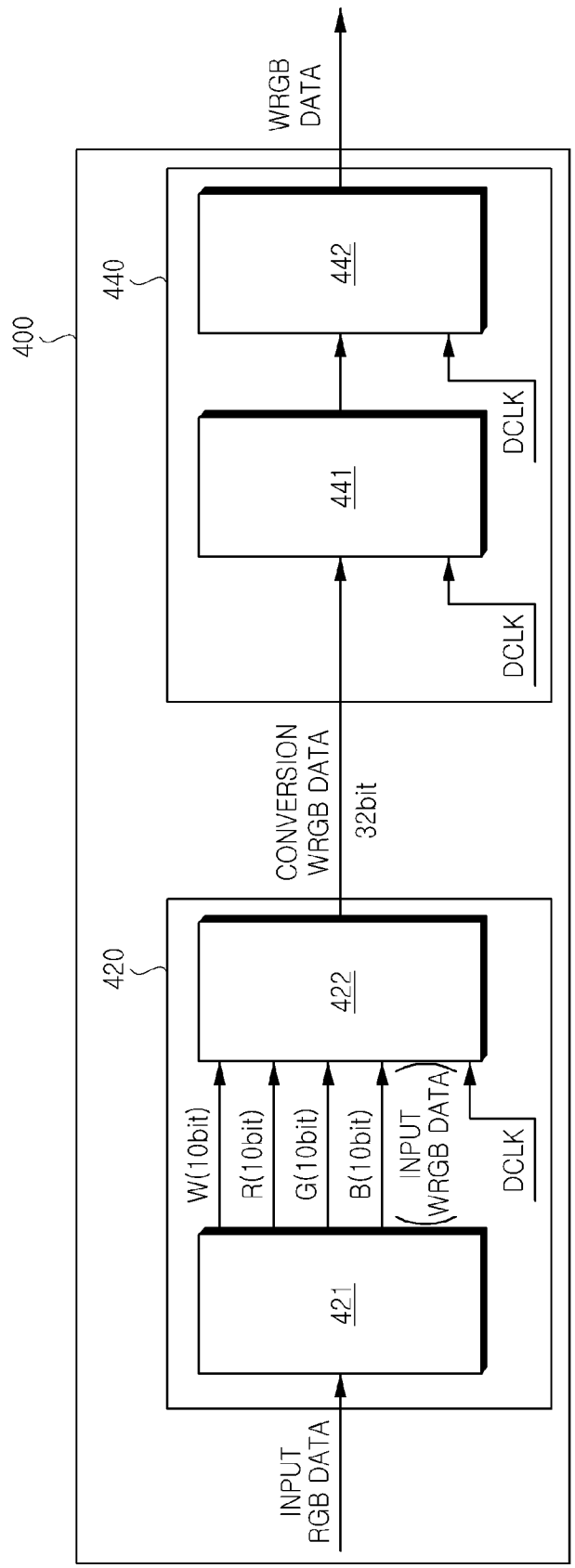
FIG. 7 is another exemplary diagram illustrating in detail an internal configuration of the timing controller according to the present invention.

FIG. 4 is an exemplary diagram illustrating in detail an internal configuration of the timing controller according to the present invention, and illustrates the internal configuration of the timing controller of FIG. 3. FIG. 5 is an exemplary diagram for describing a method in which the timing controller according to the present invention converts input RGB data into conversion WRGB data. FIG. 6 is an exemplary diagram showing a data timing for transmitting and receiving the conversion WRGB data between the timing controller according to the present invention and an external memory. A portion (A) of FIG. 6 is an exemplary diagram showing a timing for transferring WRGB data, and a portion (B) of FIG. 6 is an exemplary diagram showing a timing for transferring RGB data. FIG. 7 is another exemplary diagram illustrating in detail an internal configuration of the timing controller according to the present invention, and illustrates a configuration of each of a data aligner 420 and an EPI transmitter 440.

In the present invention, the timing controller 400 transfers RGB data and WRGB data to the source driver IC 300 in the same format. Therefore, one source driver IC may be applied to an LCD device using RGB data and an LCD device using WRGB data.

To this end, as illustrated in FIG. 4, the timing controller 400 according to the present invention includes: a reception unit 410 that receives the input RGB data from the external system; the data alignment unit 420 that converts the input RGB data into input WRGB data, converts the input WRGB data using various algorithm, and converts the input WRGB data into conversion WRGB data; a control signal generation unit 430 that generates the gate control signal GCS and the data control signal DCS with the timing signal transferred from the data alignment unit 420; and the EPI transmitter 440 that generates WRGB data by adding dummy bits to the conversion WRGB data and outputs the WRGB data to the source driver IC 300.

The reception unit 410 receives the input RGB data and the timing signal from the external system, and transfers the input RGB data to the data alignment unit 420. The timing signal received through the reception unit 410 may be directly transferred from the reception unit 410 to the control signal generation unit 430, or transferred to the control signal generation unit 430 through the data alignment unit 420.

The input WRGB data are composed of W data, R data, G data, and B data.

The R data, G data, and B data may have various number of bits. Hereinafter, for convenience of a description, a case in which the number of bits of the data is 10 will be described as an example of the present invention.

The control signal generation unit 430 may use a general control signal generation unit applied to the timing controller 400 using the EPI, and thus, its detailed description is not provided.

The data alignment unit 420, as described above, converts the input RGB data into the WRGB data and outputs the WRGB data to the source driver IC 300. To this end, as illustrated in FIG. 4, the data alignment unit 420 includes: a converter 421 that converts the input RGB data into the input WRGB data; an aligner 422 that converts one of W, R, G, and B data, composing the input WRGB data, into 0 to generate conversion WRGB data having the number of bits less than the total number of bits composing the W, R, G, and B data.

The converter 421 converts the input RGB data into the input WRGB data. The input RGB data, as shown in a portion (A) of FIG. 5, include R data, G data, and B data. The converter 421, as shown in a portion (B) of FIG. 5, converts the input RGB data into the input WRGB data including W data, R data, G data, and B data.

A method of converting the input RGB data into the input WRGB data may use general methods which are used at present, and thus, its detailed description is not provided.

The aligner 422 converts one of the W, R, G, and B data composing the input WRGB data into 0, and converts the other data into new values according to the converted result.

Moreover, the aligner 422 generates location information indicating the converted data of 0. The conversion WRGB data include the location information that includes information on three pieces of data among the W, R, G, and B data and information on the converted data of 0.

For example, the aligner 422 may convert the least data of the input WRGB data (see THE portion (A) of FIG. 5) into 0 (see a portion (C) of FIG. 5). In this case, the aligner 422 changes levels of the W, R, and B data, for keeping pace with the converting of the G data into 0. Also, the aligner 422 generates location information indicating that the G data has been converted into 0.

The above-described embodiment of the present invention will be described in detail with reference to Table 1.

TABLE 1

| Case | W | R | G | B | Tx Data |
|---|---|---|---|---|---|
| 00 | 0 | R[9:0] | G[9:0] | B[9:0] | Case 2 bit + 30 bit (R, G, B) |
| 01 | W[9:0] | 0 | G[9:0] | B[9:0] | Case 2 bit + 30 bit (W, G, B) |
| 10 | W[9:0] | R[9:0] | 0 | B[9:0] | Case 2 bit + 30 bit (W, R, B) |
| 11 | W[9:0] | R[9:0] | G[9:0] | 0 | Case 2 bit + 30 bit (W, R, G) |

First, as listed in a first line (line shown as case='00') of Table 1, the aligner 422 may convert W data among the W, R, G, and B data composing the input WRGB data into 0, and generate location information having a value of '00'. Here, the location information having the value of '00' indicates that the R data has been converted into 0.

Second, as listed in a second line (line shown as case='01') of Table 1, the aligner 422 may convert R data among the W, R, G, and B data composing the input WRGB data into 0, and generate location information having a value of '01'. Here, the location information having the value of '01' indicates that the R data has been converted into 0.

Third, as listed in at third line (line shown as case='10') of Table 1, the aligner 422 may convert G data among the W, R, G, and B data composing the input WRGB data into 0, and generate location information having a value of '10'. Here, the location information having the value of '10' indicates that the G data has been converted into 0.

Fourth, as listed in a fourth line (line shown as case='11') of Table 1, the aligner 422 may convert B data among the W, R, G, and B data composing the input WRGB data into 0, and generate location information having a value of '00'. Here, the location information having the value of '00' indicates that the B data has been converted into 0.

The conversion WRGB data, which include only three pieces of data among the W, R, G, and B data composing the input WRGB data and location information, are generated through the above-described conversion operation.

In this case, when the input WRGB data are composed of a total of 40 bits including 10 bits of the W data, 10 bits of the R data, 10 bits of the G data, and 10 bits of the B data, the conversion WRGB data are composed of a total of 32 bits including 30 bits of three data and 2 bits of location information. Therefore, the conversion WRGB data may be composed of bits less than those of the input WRGB data.

As illustrated in FIG. 7, when 40-bit input WRGB data composed of 10-bit W, R, G, and B data are received from the converter 421 to the aligner 422 through four ports, the aligner 422 generates the conversion WRGB data composed of 32 bits including 30 bits of three data among the W, R, G, and B data and 2 bits of location information. In this case, the aligner 422 is driven with the data clock for driving the input WRGB data.

The 32-bit conversion WRGB data outputted from the aligner 422 are transferred to the EPI transmitter 440.

Although not shown, the timing controller 400 may further include a plurality of elements for converting the input WRGB data or the conversion WRGB data, transferred from the converter 421 or the aligner 422, into data having one of various types.

For example, an operation of improving an image realized with the conversion WRGB data may be performed with various algorithms, an operation of correcting an image may be performed, and an operation of removing noise may be performed.

The conversion operation may be performed by the converter 421 or the aligner 422, or performed by an element (not shown) included in the timing controller 400.

The EPI transmitter 440 converts the 32-bit conversion WRGB data, transferred from the data aligner 420, into WRGB data and transfers the WRGB data to the source driver IC 300, and the EPI transmitter 440 transfers the data control signal DCS transferred from the control signal generation unit 430 to the source driver IC 300.

The EPI transmitter 440 connects the timing controller 400 with the source driver ICs (SDIC#1 to SDIC#8) in a point-to-point type, and interfaces the source driver IC 300 through the EPI.

A configuration between the EPI transmitter 440 and the source driver IC 300 is as follows.

A plurality of lines, such as a data line pair DATA&CLK, a control line pair SCL/SDA, and a lock check line LCS, are formed between the EPI transmitter 440 and the source driver ICs (SDIC#1 to SDIC#8).

The data line pair DATA&CLK serially connects the EPI transmitter 440 and each of the source driver ICs (SDIC#1 to SDIC#8) 300 in a 1:1 type, namely, a point-to-point type. Each of the source driver ICs (SDIC#1 to SDIC#8) 300 restores clocks inputted through the data line pair DATA&CLK, and thus, as illustrated in FIG. 3, lines for transferring image data RGB are not formed between the source driver ICs (SDIC#1 to SDIC#8) 300.

The lock check line LCS transfers a lock signal between the EPI transmitter 440 and the source driver IC 300 and between the source driver ICs (SDIC#1 to SDIC#8) 300. In the last source driver IC 300, the lock signal is transferred to the EPI transmitter 440 of the timing controller 400 through the lock check line LCS.

The EPI transmitter 440 transfers a chip identification code (CID) of each of the source driver ICs (SDIC#1 to SDIC#8) 300 and chip control data for controlling functions of the source driver ICs (SDIC#1 to SDIC#8) 300 to each of the source driver ICs (SDIC#1 to SDIC#8) 300 through the control line pair SCL/SDA.

The EPI transmitter 440 transfers the 32-bit conversion WRGB data, transferred from the aligner 420, to each of the source driver ICs 300 through the data line pair.

The EPI transmitter 440 may transfer the 32-bit conversion WRGB data as-is, but, as illustrated in the portion (A) of FIG. 6, the EPI transmitter 440 generates WRGB data of a total of 36 bits by adding four dummy bits to the conversion WRGB data transferred by one clock, and outputs the WRGB data to the source driver IC 300.

In this case, as expressed in the following Equation (3), the maximum data transfer rate of the EPI transmitter is 1.224 Gbps. When the maximum frequency of a data clock is 85 MHz, the RGB data are composed of 36 bits, the RGB data are transferred to the source driver IC through four ports, and the number of source driver ICs (EPI ports) is 10, the maximum data transfer rate is 1.224 Gbps.

$$\text{Data Rate Max} = 85\ \text{MHz} \times 4\text{Port}/10\text{SDIC} \times 36\ \text{bit} = 1.224\ \text{Gbps} \quad (3)$$

The maximum data transfer rate is within a range of 1.6 Gbps that is the maximum data transfer rate between the EPI transmitter and the source driver IC. Therefore, the RGB data are normally transferred to the source driver IC.

In the related art LCD device, a data transfer rate of an EPI transmitter of a related art timing controller exceeds the maximum data transfer rate of a source driver IC, for transferring WRGB data to the source driver IC. However, according to the present invention, as described above, the maximum data transfer rate is within a range of the maximum data transfer rate of the source driver IC.

The timing controller 400 according to the present invention, as described above, may transfer WRGB data to the source driver IC 300 within a range of the maximum data transfer rate of the source driver IC 300, and moreover, may transfer RGB data to the source driver IC 300 in the same format as that of WRGB data.

When the timing controller 400 is used for receiving input RGB data from the external system and transferring the RGB data to the source driver IC 300, as illustrated in the portion (B) of FIG. 6, the EPI transmitter 440 generates RGB data of a total of 36 bits by adding 6 dummy bits to 30-bit RGB data transferred by one clock, and outputs the RGB data to the source driver IC 300.

In this case, as expressed in the following Equation (3), the maximum data transfer rate of the EPI transmitter is 1.224 Gbps. When the maximum frequency of a data clock is 85 MHz, the RGB data are composed of 36 bits, the RGB data are transferred to the source driver IC through four ports, and the number of source driver ICs (EPI ports) is 10, the maximum data transfer rate is 1.224 Gbps.

$$\text{Data Rate Max} = 85\ \text{MHz} \times 4\text{Port}/10\text{SDIC} \times 36\ \text{bit} = 1.224\ \text{Gbps} \quad (4)$$

The maximum data transfer rate is within a range of 1.6 Gbps that is the maximum data transfer rate between the EPI transmitter and the source driver IC, and moreover, as expressed in Equation (3), the maximum data transfer rate is equal to the maximum data transfer rate necessary for transferring WRGB data to the source driver IC 300.

Also, a data format (36 bits) in transferring RGB data is the same as a data format (36 bits) in transferring WRGB data.

Therefore, the EPI transmitter 440 may be used to transfer WRGB data to the source driver IC 300, and moreover, may be used to transfer RGB data to the source driver IC 300. That is, the timing controller 400 according to the present invention may transfer WRGB data and RGB data to the source driver IC 300 in the same format.

Thus, the source driver IC 300 may receive WRGB data and output the WRGB data to the panel 100. Alternatively, the source driver IC 300 may receive RGB data and output the RGB data to the panel 100.

Accordingly, the timing controller 400 and the source driver IC 300 may be applied to an LCD device that outputs an image with WRGB data and an LCD device that outputs an image with RGB data.

The EPI transmitter 440, as illustrated in FIG. 7, may include: a format unit 441 that converts WRGB data, transferred from the aligner 422, into the format of FIG. 6; and a transfer unit 442 that transfers the WRGB data, transferred from the format unit 441, to the source driver IC 300 through the EPI.

The present invention provides the interface that is used for RGB data and WRGB data in common. To provide an additional description, by applying the arrangement of data sequence and the number of cases when transferring WRGB data, the present invention transfers and receives WRGB data and RGB data in the same format.

Comparing with the related art, the present invention can reduce a data transfer rate, and the segmentation of WRGB data is not required in transfer.

As described above, the present invention converts input RGB data into input WRGB data, generates WRGB data including location information on data (which are generated by converting one of W, R, G, and B data composing the input WRGB data into 0) and the converted data of 0, and transfers the WRGB data to a source driver IC. Accordingly, the present invention can be applied to both a case of transferring and receiving RGB data and a case of transferring and receiving WRGB data.

Moreover, the present invention can reduce a data transfer rate for transferring WRGB data by 25% compared to the related art.

Accordingly, according to the present invention, one source driver IC and one timing controller can be used for transferring and receiving RGB data and WRGB data in common, and thus, a design for the common use of the source driver IC can be made.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A timing controller, comprising:
    a receiver receiving input RGB data from an external system;
    a converter converting the input RGB data into input WRGB data;
    an aligner converting one of W, R, G, and B data, composing the input WRGB data, into 0 to generate conversion WRGB data having bits less than the total number of bits composing the W, R, G, and B data, and optionally converting the other data into new values according to the converted result; and
    an EPI transmitter generating WRGB data by adding dummy bits to the conversion WRGB data, and outputting the WRGB data to a source driver IC.

2. The timing controller of claim 1, wherein the aligner converts one of the W, R, G, and B data composing the input WRGB data into 0, converts the other data into new values according to the converted result, and generates location information indicating the converted data of 0, thereby generating the conversion WRGB data.

3. The timing controller of claim 1, wherein the aligner converts one of the W, R, G, and B data composed of 10 bits into 0, converts the other data into new values according to the converted result, and generates 2-bit location information indicating the converted data of 0, thereby generating the conversion WRGB data of 32 bits.

4. The timing controller of claim 3, wherein the EPI transmitter generates the WRGB data of 36 bits by adding 4 bits to the conversion WRGB data of 32 bits, and outputs the WRGB data to the source driver IC.

5. A method of driving a timing controller, comprising:
    receiving input RGB data and a timing signal from an external system;
    converting the input RGB data into input WRGB data;
    converting one of W, R, G, and B data, composing the input WRGB data, into 0 to generate conversion WRGB data having bits less than the total number of bits composing the W, R, G, and B data, and optionally converting the other data into new values according to the converted result; and
    generating WRGB data by adding dummy bits to the conversion WRGB data, and outputting the WRGB data to a source driver IC.

6. The method of claim 5, wherein the converting of the input RGB data to generate conversion WRGB data comprises converting one of the W, R, G, and B data composed of 10 bits into 0, converting the other data into new values according to the converted result, and generating 2-bit location information indicating the converted data of 0, thereby generating the conversion WRGB data of 32 bits.

7. A flat panel display device, comprising:
    the timing controller of claim 1;
    a panel, a plurality of data lines and gate lines being formed in the panel;
    at least one or more source driver ICs converting the WRGB data, transferred from the timing controller, into analog WRGB image signals and respectively outputting the WRGB image signals to the data lines; and
    at least one or more gate driver ICs generating a scan signal with a control signal transferred from the timing controller, and sequentially outputting the scan signal to the gate lines.

8. The flat panel display device of claim 7, wherein the timing controller transfers the WRGB data to the source driver IC through an EPI.

9. The flat panel display device of claim 7, wherein when the panel has an RGB pixel structure,
    the timing controller converts the input RGB data into RGB data without generating the WRGB data, and transfers the converted RGB data to the source driver IC, and
    the source driver IC converts the RGB data into analog RGB image signals, and outputs the analog RGB image signals to the respective data lines.

10. The flat panel display device of claim 9, wherein the RGB data have the number of bits equal to the number of bits of the WRGB data.

11. The flat panel display device of claim 7, wherein the aligner converts one of the W, R, G, and B data composing the input WRGB data into 0, converts the other data into new values according to the converted result, and generates location information indicating the converted data of 0, thereby generating the conversion WRGB data 12. The flat panel display device of claim 7, wherein the aligner converts one of the W, R, G, and B data composed of 10 bits into 0, converts the other data into new values according to the converted result, and generates 2-bit location information indicating the converted data of 0, thereby generating the conversion WRGB data of 32 bits.

13. The flat panel display device of claim 7, wherein the EPI transmitter generates the WRGB data of 36 bits by adding 4 bits to the conversion WRGB data of 32 bits, and outputs the WRGB data to the source driver IC.

* * * * *